United States Patent [19]

Lalk et al.

[11] 3,923,717

[45] Dec. 2, 1975

[54] A KILN FEED SLURRY FOR MAKING PORTLAND CEMENT CONTAINING AN INORGANIC SLAT OF A STYRENE-MALEIC ANHYDRIDE COPOLYMER

[75] Inventors: Robert H. Lalk; Syamalarao Evani, both of Midland, Mich.

[73] Assignee: The Dow Chemical Company, Midland, Mich.

[22] Filed: Aug. 19, 1974

[21] Appl. No.: 498,482

[52] U.S. Cl. ............... 260/29.6 S; 106/90; 106/314; 260/29.6 H; 260/42.13
[51] Int. Cl.² .... C08K 3/00; C04B 7/02; C04B 7/35
[58] Field of Search ....... 260/29.6 S, 29.6 H, 42.13; 106/90, 314

[56] References Cited
UNITED STATES PATENTS

| | | | |
|---|---|---|---|
| 2,614,998 | 9/1949 | Lea | 260/29.6 S |
| 3,037,957 | 6/1962 | Bruere | 260/29.6 S |
| 3,140,269 | 7/1964 | Wahl et al. | 260/29.6 S |
| 3,563,777 | 2/1971 | Pratt et al. | 260/29.6 S |
| 3,563,930 | 2/1971 | Stram et al. | 260/29.6 S |

*Primary Examiner*—Eugene C. Rzucidlo
*Attorney, Agent, or Firm*—Stephen Hoynak

[57] ABSTRACT

Superior reduction of water demand of wet process portland cement slurries is shown by water-soluble salts of styrene-maleic anhydride copolymers, having a molecular weight range of from about 1000 to about 5000.

12 Claims, No Drawings

A KILN FEED SLURRY FOR MAKING PORTLAND CEMENT CONTAINING AN INORGANIC SLAT OF A STYRENE-MALEIC ANHYDRIDE COPOLYMER

BACKGROUND OF THE INVENTION

The present invention relates to the use of monovalent salts of styrene-maleic anhydride copolymers having molecular weight range of from about 1000 to about 5000 to reduce the amount of water required for preparing a slurry of ingredients used in producing portland cement.

It is known that polyelectrolytes such as polyacrylic acid salts, copolymers of acrylic acid and acrylamide, hydrolyzed polyacrylonitrile and the like which are flocculants at higher molecular weights show different properties and act as dispersants at lower molecular weights. Such polymers having molecular weights from a few thousand up to about 50,000, for example, have been recommended for use in various dispersant applications.

In the wet grinding process for making portland cement, limestone and clay and optionally a small amount of iron oxide are ground in the presence of water to obtain a uniform slurry of very fine particles. This slurry is then fed into a high temperature kiln where it is dried and calcined to form the clinker that is then dry ground to make portland cement. The water demand of the finely ground limestone-clay slurry is fairly high and requires a relatively large proportion of water, for example, about 35–50% by weight, to obtain a fluid, pumpable slurry. This limits the rate at which the slurry can be processed and fed to the kiln and it also increases the fuel requirement to dry and calcine a given quantity of solids to the clinker stage.

Many substances with dispersant activity are available and have been tried in order to decrease the water demand of suspended inorganic solids in various high solids water suspensions or slurries for various applications, particularly in the wet grinding step of the wet process for making portland cement. Most of these have proven relatively ineffective or undesirable for one reason or another. Complex phosphates are undesirable because they tend to hydrolyze at the warm temperatures developed during grinding and in storage of the slurry and because of the adverse effect of residual phosphate on the properties of the final portland cement product. Lignosulfonates have been tried for this use, but these require high addition levels for only marginal improvement. They also lose their activity rapidly during storage of the slurry.

SUMMARY OF THE INVENTION

It has now been found that water-soluble inorganic salts of copolymers of styrene and maleic anhydride of molecular weight from about 1000 to about 5000 are unexpectedly effective for reducing the water demand to maintain the fluidity of high solids content of ingredients used for the aqueous suspensions in the wet process for making portland cement. These copolymers are further characterized by a ratio of from about 50–67 mole percent of styrene and 50–33 mole percent of maleic anhydride. The preferred copolymer molecules have a molecular weight of from about 1200 to about 3000 with a mole ratio of styrene to maleic anhydride of 1:1. These are particularly effective dispersing agents for limestone-clay suspensions used in wet grinding process for making cement. Copolymer amounts of about 0.01–0.2 percent by weight of solids are operable and about 0.02–0.1 percent is preferred and most preferred is a range of 0.02 to 0.075 percent, based on the slurry solids.

DETAILED DESCRIPTION

The copolymers which are useful in the present invention can be made by known processes. U.S. Pat. No. 2,606,891 discloses a process in which styrene and maleic anhydride are dissolved in an inert organic solvent, such as acetone, dioxane or a liquid ester. 1 to 40% of a soluble mercaptan of 5 to 22 carbon atoms, and .25 to 5% of a known organic peroxide catalyst are added. The mixture is then heated to 50–150°C.

U.S. Pat. No. 2,640,819 discloses a process in which a mixture of styrene and maleic anhydride is mass copolymerized in the presence of .01 to 2 weight percent of 2,5-ditertiary butyl parabenzoquinone. The polymerization can be effected by heating or by a combination of heat and a known organic peroxide catalyst.

A third method is disclosed in U.S. Pat. No. 3,085,994. The styrene, maleic anhydride and an organic peroxide catalyst are dissolved in an alkyl benzene in which the alkyl group has at least 2 C atoms, such as ethylbenzene, cumene or P-cymene, and the mixture is heated to 85–120°C. The alkyl aromatic is a solvent for the monomers, but a non-solvent for the low molecular weight copolymer.

It is to be understood, however, that the process of making the styrene-maleic anhydride copolymer is not critical to this invention. Any styrene-maleic anhydride copolymer, within the 1000–5000 molecular weight range and the mole ratio specified above can be used, without regard to its method of preparation. The water content of the finished slurry can be as low as 25% and as high as 35% by weight.

In the wet process for making portland cement, the raw materials, including ingredients such as limestone, dolomite, oyster shells, blast furnace slag or other well known high calcium-containing products, are mixed with silicious materials, including slag, clay, shale or any other silica containing ingredient in amounts such that the calcium and silica materials constitute about 85% by weight of the clinker formed after heating in a kiln. The remaining ingredients include aluminum-containing and iron-containing ingredients. The mixture of raw ingredients, using well-known process steps, is ground with the addition of water to prepare an aqueous slurry, which is then screened and pumped into storage silos preparatory to further blending with other slurries or feeding into a clinkering kiln. Usually, the portion which passes a 200 mesh screen is used for preparing the clinker. Such slurries contain from 30–50% water by weight.

On an emperical basis, the cements made by grinding the resulting clinker will contain

| | |
|---|---|
| $SiO_2$ | 19–23% |
| $Al_2O_3$ | 4– 8% |
| $Fe_2O_3$ | 1.5– 6% |
| CaO | 62–67% |
| MgO | .6– 5% |

The sytrene-maleic anhydride copolymer product is used in the form of a water-soluble salt, usually the sodium salt. Other such salts, for example, the potassium and ammonium salts will also serve, but not as well as the sodium salt. Surprisingly, these copolymeric salts are very effective in maintaining fluidity of the aqueous high solids mineral suspensions.

These copolymeric salts are extremely effective for reducing water demand and promoting fluidity in various kinds of high solids raw cement slurries consisting largely of limestone and clay, usually with a small amount of iron oxide. In this application the above-described copolymeric salts have a unique combination of efficiency, stability and compatability in the wet grinding process slurries together with a lack of any adverse effects in the calcining process. A reduction of up to 30 percent of the water content can be achieved, so that with the same volume feed to the cement kiln, up to 30–35 percent increases in production can be obtained with lower fuel costs. Increasing the feed rate to the kiln while operating at normal fuel input results in even further increases in clinker production.

The examples herein are intended to illustrate, but not limit, the invention. Parts and percentages are given by weight unless stated otherwise.

EXAMPLE 1

A wet portland cement slurry obtained from a commercial source contained 37% water. The viscosity was measured by a Brookfield LTV viscometer employing a No. 3 spindle at 12 RPM. A reading on the 100 scale was converted and recorded as the control viscosity. As received, this slurry had a viscosity of 4150 centipoise (the reading was the maximum during the first two revolutions of the viscometer cup). A portion of the slurry was evaporated down to 31.4% water. The viscosity of the slurry at this water content was 9000 centipoise. A 30 weight % of aqueous solution of the sodium salt of a 1:1 mole ratio styrene-maleic anhydride copolymer having a molecular weight of about 1600 was added in varying small amounts to samples of this concentrated slurry and the viscosity was measured by the procedure described above. The following results were recorded:

| Wt. % Copolymer Salt Added (Based on Slurry Solids) | Viscosity Centipoise |
| --- | --- |
| .01 | 6300 |
| .02 | 3500 |
| .03 | 2100 |
| .04 | 800 |

From these data it is apparent that addition of only .02 weight % of the sodium salt of the copolymer provides a slurry with a somewhat lower viscosity than it had prior to concentration, even though the slurry contained 5.6% less water. Further, the viscosity of the slurry containing only 31.4% water was reduced from 9000 centipoise to a readily pumpable slurry of 3500 centipoise viscosity.

EXAMPLE 2

A wet process cement slurry different from that of example 2 had a moisture content of 33.4% and a viscosity of 3300, centipoise as measured by the Brookfield viscometer procedure described above, using a No. 3 spindle and a rotation rate of 12 RPM.

The water content of the slurry was reduced to 28% by evaporation of water at room temperature. At 28% water the slurry had a viscosity of 5300 centipoise.

The 30 weight % aqueous solution of the sodium salt of styrene-maleic anhydride copolymer described in Example 1 was added to the aqueous (28%) slurry and the following data were recorded:

| Wt. % Copolymer Salt Added (Based on Slurry Solids) | Viscosity Centipoise |
| --- | --- |
| .01 | 4550 |
| .02 | 4400 |
| .03 | 4000 |
| .04 | 3500 |
| .05 | 2800 |
| .06 | 2500 |
| .07 | 1700 |
| .10 | 600 |

From these data it is apparent that .04% of the polymeric salt was sufficient to reduce the viscosity of the slurry to approximately that of the original sample which contained 33.4% water.

EXAMPLE 3

In this example sodium salts of (1) a styrene-maleic anhydride copolymer of a molecular weight approximately 1600 made from equimolar proportions of styrene and maleic anhydride (2) a copolymer of a molecular weight approximately 4000 made from a monomeric mixture of about 38 mole % maleic anhydride and 62 mole % styrene, and (3) copolymer of about 20000 molecular weight made from equimolar proportions of styrene and maleic anhydride were tested using a wet process cement slurry containing 31% water. Sodium salts of the 1600 and 4000 molecular weight copolymers were prepared in 30 weight % aqueous solution and the salt of the 20,000 molecular weight copolymer was prepared as a 15 weight % solution for mixing with the slurry. The initial viscosity, as determined with the Brookfield viscometer using a No. 3 spindle and 12 RPM, was 8300–8400. Data recorded in these runs are tabulated below:

| Weight Percent Copolymer Salt Added (Based on Slurry Solids) | Viscosity Centipoise | | |
| --- | --- | --- | --- |
| | (1) | (2) | (3) |
| | 1600 | 4000 | 20000 |
| 0.01 | 5100 | 6000 | 7800 |
| 0.02 | 3400 | 4650 | 7100 |
| 0.03 | 1750 | 2900 | 7600 |
| 0.04 | 750 | 2200 | 7800 |
| 0.05 | — | 1500 | 7300 |

These data show that as little as .02% by weight of the 1600 molecular weight copolymer salt is sufficient to reduce viscosity to a pumpable range. Slightly more, .02–.03, % of the copolymer salt is needed with the 4000 molecular weight product. A molecular weight of 20,000, however, is too high for use in the process, because it does not reduce viscosity of the slurry uniformly nor to the degree where it is readily pumpable even at .05% concentration.

In commercial operation, the preferred procedure is to meter or proportion a relatively concentrated aqueous solution of the water-soluble copolymer salt and water into the grinding mill. The proportions of water and copolymer salt are readily adjustable to give the desired concentration of the salt in the mixture.

We claim:

1. A kiln feed slurry useful in a wet process to produce portland cement, having a water content of between 25% and 35% by weight and sufficient to render the slurry pumpable, said slurry containing from about .01 to about 0.1 weight % of a monovalent inorganic salt of a copolymer containing from about 33 to about 50 mole % of maleic anhydride and from about 67 to about 50 mol % styrene and a molecular weight of from about 1000 to about 5000.

2. The composition of claim 1 in which the salt is a sodium salt.

3. The composition of claim 1 in which the salt is an ammonium salt.

4. The composition of claim 1 in which the salt is a potassium salt.

5. The composition of claim 1 in which the copolymer has a molecular weight of from about 1200 to about 3000 and the salt is a sodium salt which is present in the mixture in from about .02 to about .75% by weight.

6. A method of preparing a kiln feed water slurry in the wet process for producing portland cement which comprises adding to the kiln feed water slurry mixture from about 0.01 to about 0.1% by weight based on slurry solids of a water soluble monovalent inorganic salt of a styrene maleic anhydride copolymer having from 50 to 67 mol % of styrene and 33 to 50 mol % of maleic anhydride and a molecular weight of from about 1000 to about 5000.

7. The method of claim 1 in which the copolymer is an alternating copolymer of equimolar proportions of styrene and maleic anhydride.

8. The method of claim 7 in which the salt is a sodium salt.

9. The method of claim 7 in which the salt is an ammonium salt.

10. The method of claim 7 in which the salt is a potassium salt.

11. The method of claim 8 in which the amount of copolymer salt is .02 to .075 weight %.

12. The method of claim 7 in which the slurry contains from about 25 to about 35% water, and from about .02 to about .075 weight % of a sodium salt of an equimolar copolymer of styrene and maleic anhydride having a molecular weight of about 1600.

* * * * *